(12) United States Patent
Larios et al.

(10) Patent No.: US 10,637,838 B1
(45) Date of Patent: Apr. 28, 2020

(54) SECURE INTERPROCESS COMMUNICATIONS BETWEEN MOBILE DEVICE APPLICATIONS USING PHONE-GENERATED KEYS

(71) Applicant: moovel, N.A., LLC, Austin, TX (US)

(72) Inventors: Pedro Larios, Lakeway, TX (US); Celite Milbrandt, Austin, TX (US)

(73) Assignee: moovel North America, LLC, Portland, OR (US)

( * ) Notice: Subject to any disclaimer, the term of this patent is extended or adjusted under 35 U.S.C. 154(b) by 221 days.

(21) Appl. No.: 15/201,264

(22) Filed: Jul. 1, 2016

Related U.S. Application Data

(60) Provisional application No. 62/187,700, filed on Jul. 1, 2015.

(51) Int. Cl.
*H04L 29/06* (2006.01)
*H04W 12/06* (2009.01)
*H04W 12/04* (2009.01)
*G06F 9/54* (2006.01)

(52) U.S. Cl.
CPC .......... *H04L 63/0464* (2013.01); *G06F 9/546* (2013.01); *H04L 63/06* (2013.01); *H04L 63/08* (2013.01); *H04W 12/04* (2013.01); *H04W 12/06* (2013.01)

(58) Field of Classification Search
CPC .................................................. H04L 63/0464
USPC ........................................................ 713/155
See application file for complete search history.

(56) References Cited

U.S. PATENT DOCUMENTS

| | | | |
|---|---|---|---|
| 2007/0162766 A1 | 7/2007 | Watanabe | |
| 2014/0177839 A1* | 6/2014 | Wagner | H04L 9/0822 380/259 |
| 2015/0156061 A1* | 6/2015 | Saxena | H04W 4/50 715/733 |
| 2015/0304934 A1* | 10/2015 | Malatack | H04L 45/745 455/552.1 |
| 2016/0359945 A1* | 12/2016 | Boudville | H04L 67/02 |
| 2016/0364824 A1* | 12/2016 | Bryant | G06Q 50/30 |
| 2017/0052835 A1 | 2/2017 | Cook | |

\* cited by examiner

*Primary Examiner* — Peter C Shaw
(74) *Attorney, Agent, or Firm* — Jones Day

(57) ABSTRACT

Systems and methods for secure communications between mobile applications installed on a user's mobile device. In some embodiments, a first application installed on a user's mobile device generates a key and transmits the key and a message to a server, where the message is to be communicated to a second application. According to disclosed embodiments, there is no limit on the size or a type of data included in the message. The server receives the message and the key from the first application. The first application shares the key with the second application which is then transmitted to the server for authenticating the second application. Upon authenticating the second application, the server transmits the message to the second application. In some embodiments, the applications and/or the server exchanges data with goods/services providers associated with the applications.

18 Claims, 8 Drawing Sheets

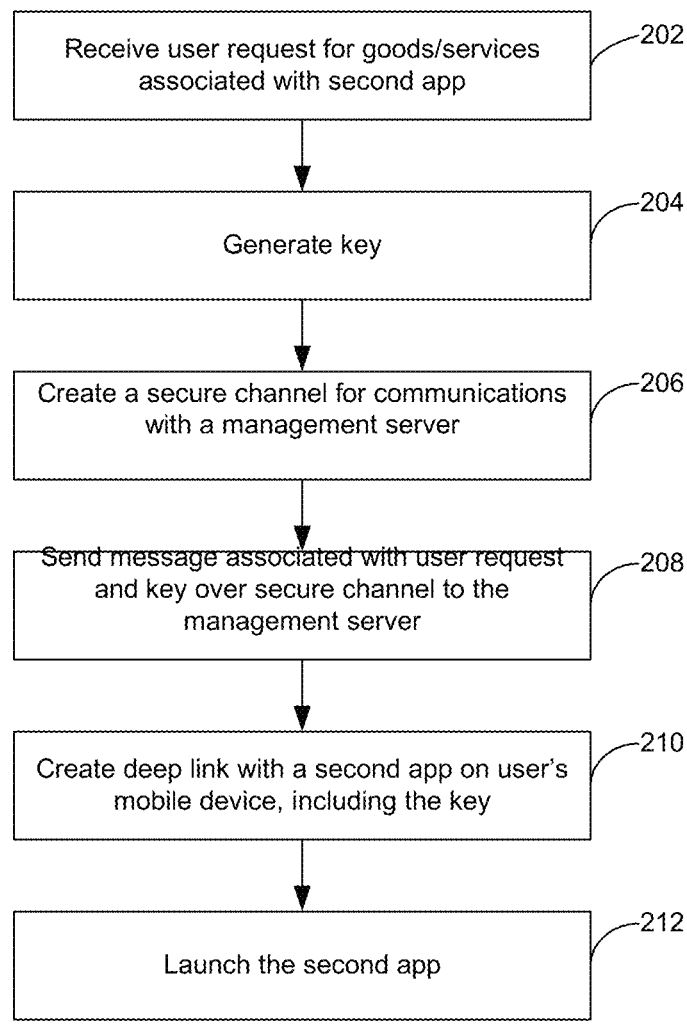
FIG. 2 (Calling App Perspective)

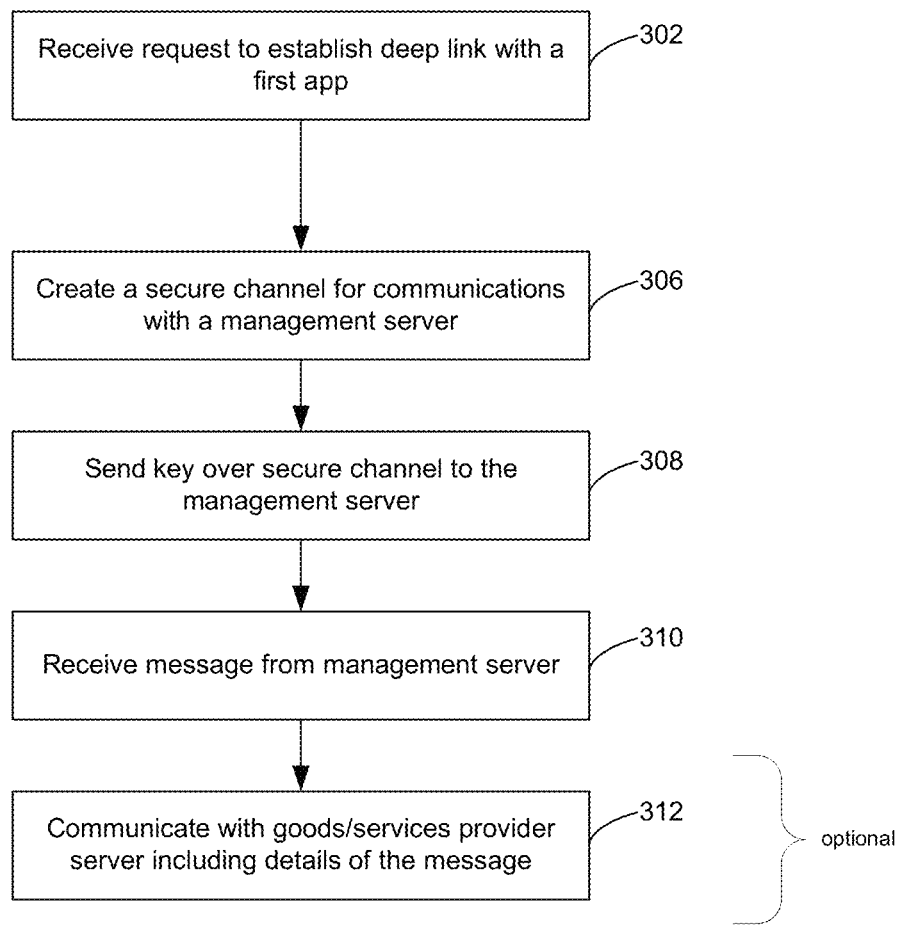
FIG. 3 (Called App Perspective)

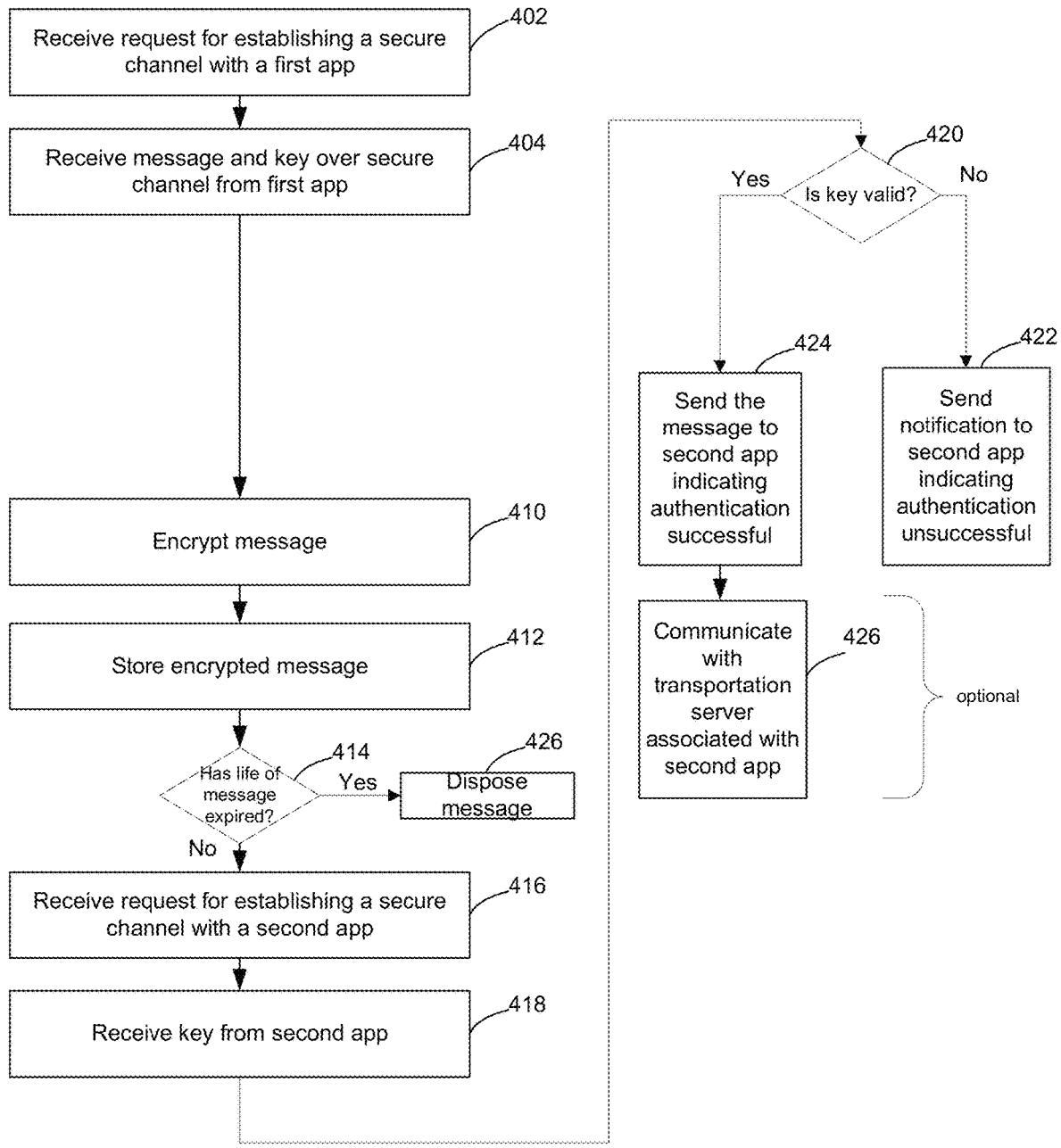
*FIG. 4 (Server Perspective)*

Message: {"request": "rent_bike", "lat": 30.3677, "lng": -97.7412}

Key: 7200062e97001467157613751000001
         \_____/_____/_____/
           502        504           506

Deep link: app2://ridetap/7200062e97001467157613751000001

*FIG. 5*

SECURE INTERPROCESS COMMUNICATIONS BETWEEN MOBILE DEVICE APPLICATIONS USING PHONE-GENERATED KEYS

CROSS-REFERENCE TO RELATED APPLICATION(S)

The present application claims priority to and benefit from U.S. Provisional Patent Application No. 62/187,700 titled "Secure Interprocess Communications Between Mobile Device Applications" filed on Jul. 1, 2015, the entire content of which is herein expressly incorporated by reference for all purposes.

TECHNICAL FIELD

The present disclosure relates to a secure mechanism for communications between mobile applications on the same device. Specifically, embodiments disclosed herein relate to a secure mechanism for communications between two or more mobile applications installed on a user's mobile device.

BACKGROUND

In the context of software development and programming, inter-process communication (IPC) is a method of sharing data across multiple processes using messaging or communication protocols, where processes are instances of a computer program (e.g., an application) that is being executed. Typically, applications using IPC are categorized as associated with clients and servers, where the client requests data or information and the server responds to client requests. However, in some scenarios, communications involve both clients and servers, as commonly seen in distributed computing. Methods for IPC are often divided into categories which vary based on software requirements, such as performance and modularity requirements, and system parameters, such as network bandwidth and latency.

IPC provides several advantages. First, IPC can be used to share information between various applications or processes. An example would be implementing inter-process communication systems which share information among web servers to share web documents.

Additionally, IPC can facilitate the distribution of computing labor across different systems. For example, IPC can facilitate in servicing client requests by distributing the requests among multiple servers that communicate with each other. Similarly, IPC can be used to separate various layers of software execution based on different privileges or user roles in an organization. Such a structure can provide security and reduce the risk of attacks.

Mobile deep linking is a form of IPC that can be used to open or call an application (alternatively referred to herein as "app") at a specific location within a different app. For example, a calling app can request a called app to perform some specific tasks on behalf of the calling app. As a result, using such a process, software developers can facilitate app to app communication.

However, mobile deep linking has a number of drawbacks and limitations. Specifically, deep linking requires the use of a uniform resource identifier (URI) that links to a specific location within a mobile application. These URIs contain all the required information to launch directly to a particular location within an app. However, because the deep linking mechanism uses uniform resource identifiers (URI), the length of the messages that can be exchanged is limited by the platform or app, with a large number of browsers and systems supporting only a maximum of 2000 characters.

Furthermore, when data in the URI is plain text, it is insecure from a data security perspective. Conversely, when the data in the URI is encrypted, it requires the apps to share keys/secrets for decryption. In many cases, the encoded result is longer than the original message, so this reduces the size of the message that can be sent given a maximum number of characters supported by the platform or app. In essence, there is a tradeoff between the size of the message or data capacity and the security of that message or data. An additional limitation is that the data in the message is limited to alpha-numeric characters (regardless of whether it is encrypted or not) as it has to conform to the URI specification.

SUMMARY

Embodiments of the invention(s) described herein provide a secure mechanism to communicate and exchange data between apps by providing a system that allows for the encryption and decryption of a message of any size and any type of data. Thus, embodiments of the present disclosure do not limit the type of data or the size of the data exchanged between apps. When a first (calling) app needs to send a message to a second (called) app, it first generates a key and a message both of which are sent to a server. The server encodes the message. The key is used by the first app to create a deep link which will open the second (target) app. When the second app is launched, the key is sent to the server by the second app. The server decodes the message and returns the original message to the second app. In this way, the apps can send secure messages back and forth on any mobile platform. The advantage of this manner of exchanging messages is to prevent the compromise of the security of the message. For example, the message can include a user's financial information, social card number, sensitive information, or other personally identifiable information.

BRIEF DESCRIPTION OF THE DRAWINGS

FIG. 2 illustrates a flow from the perspective of a first application that intends to initiate communication with a second application, the first application and the second application running on the user's mobile device, according to an embodiment of the present disclosure.

FIG. 3 illustrates a flow from the perspective of a second application that receives communication from a first application, the first application and the second application running on the user's mobile device, according to an embodiment of the present disclosure.

FIG. 4 illustrates a flow from the perspective of a management server that facilitates secure communications between mobile apps, according to an embodiment of the present disclosure.

FIG. 5 illustrates example components involved in secure communication between two apps, according to an embodiment of the present disclosure.

DETAILED DESCRIPTION

This disclosure and various features are explained more fully herein with reference to the illustrative, and therefore non-limiting embodiments shown in the accompanying drawings and description. Descriptions of known programming techniques, application software development, software, hardware, operating systems, and protocols may be omitted so as not to unnecessary obscure the disclosure in detail. It should be understood, however, that the detailed description and specific examples, while indicating certain preferred embodiments are given by way of illustration only and not by way of limitation. Various substitutions, modifications, additions, and arrangements within the scope of the invention(s) described herein will become apparent to a person of ordinary skill in the art in light of this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not an exclusive or.

Additionally, any examples or illustrations given herein are not to be regarded in any way as restrictions on, limits to, or express definitions of, any term or terms which with which they are utilized. Instead these examples or illustrations are to be regarded as being described with respect to one particular embodiment and as examples only. Persons of ordinary skill in the art will appreciate that any terms or terms with which these examples or illustrations are utilized encompass other embodiments as well as implementations and adaptations thereof which may or may not be given therewith or elsewhere in the specification, and all such embodiments are intended to be included within the scope of that term or terms.

Figure 1A:
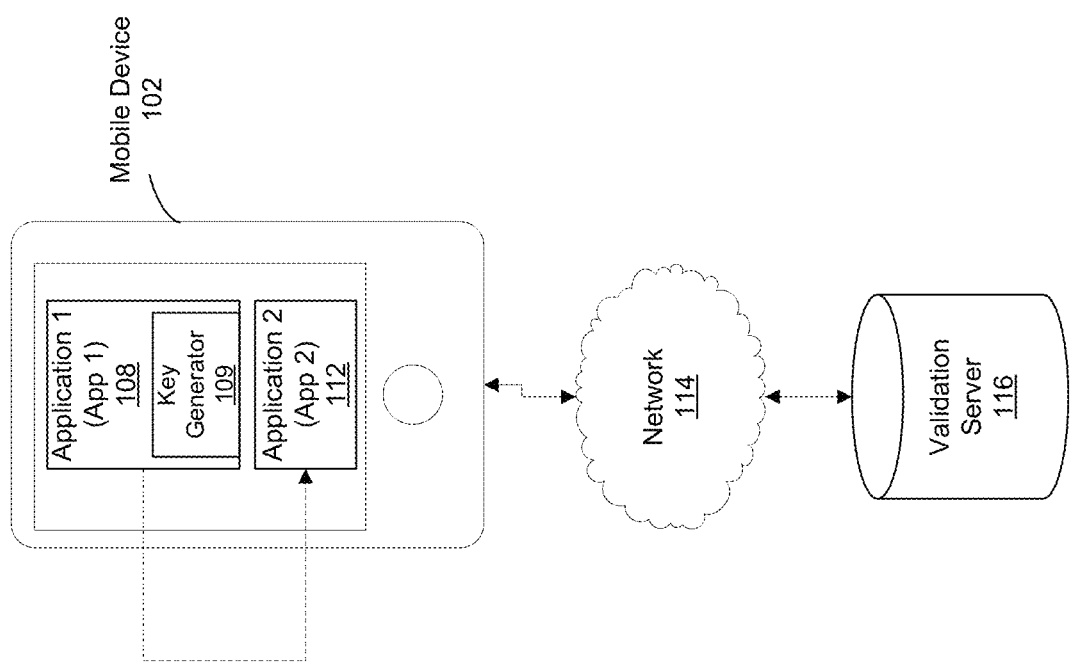
FIGS. 1A, 1B, and 1C illustrate example embodiments of secure communication between two apps based on a key generated by one of the apps, both apps being included in a user's mobile device.
Figure 1B:
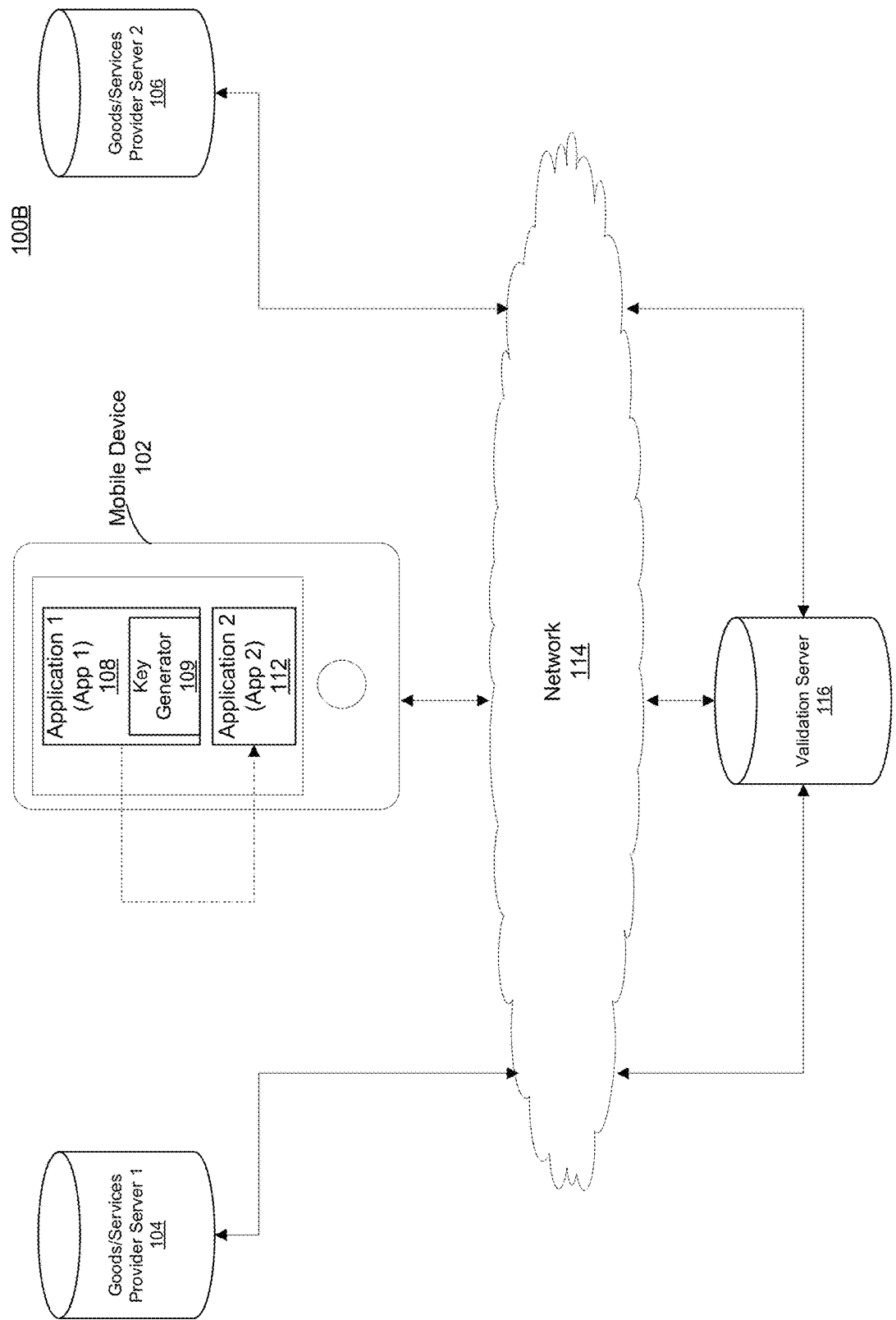

FIGS. 1A, 1B, and 10 illustrate example embodiments 100A, 100B, and 100C of secure communication between two apps based on a key generated by one of the apps, both apps being included in a user's mobile device. For example, FIG. 1A shows Application 1 (app 1) 108 intending to communicate a message with Application 2 (app 2) 112 in a user's mobile device 102. Instead of directly communicating the message to app 2, app 1 sends the message along with a key to validation server 116 via one or more networks 114. The key (generated by a key generation module included in app 1), for example, can be a concatenation of (i) a unique ID of the device (such as a MAC address of a network interface or a Bluetooth address), (ii) a timestamp (in milliseconds), and (iii) a hash of the message being sent. According to disclosed embodiments, this manner of communications is agnostic to the type of the message or a size of the message that app 1 intends to communicate to app 2. For example, the message can include complex data (e.g., a JavaScript Object Notation JSON object) or any type of data. The message and the key are received by a server (e.g., validation server 116). App 1 can share the key with app 2 so that app 2 can retrieve the message from validation server 116. It will be appreciated that this method of generating a key by app 1 has the advantage that app 1 doesn't have to wait to send the key to app 2, i.e., app 1 can send the key to validation server 116 and app 2 simultaneously, or with virtually no delay. In some embodiments, validation server 116 encrypts the message and stores the encrypted message until app 2 requests for the message to be retrieved. When validation server 116 receives a request from app 2 for retrieval of the message, validation server 116 decrypts the message before sending the message to app 2. In some embodiments, the message has a limited life span and expires after a predetermined interval of time. This predetermined interval, for example, can be configured to suit the requirements of different applications. Thus, if app 2 fails to request retrieval of the message within a certain interval of time, the message can expire. Such a scenario can be contemplated when the user's mobile device has no connectivity with validation server 116 for a period of time greater than the predetermined interval of time. In some embodiments, communications between validation server 116 and app 1 as well as those between the validation server 116 and app 2 are sent over a secure channel, e.g., using the HTTP over SSL protocol (HTTPS). Network 114 can include external networks such as the telephony network (e.g., Public Switched Telephony Network, cellular, wifi, and other voice and wireless networks) or the Internet. In some embodiments, network 114 can include multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

The example embodiment illustrated in FIG. 1B builds upon the FIG. 1A embodiment by showing goods/services provider servers associated with the respective apps. Accordingly, FIG. 1B shows that app 1 is associated with a goods/services provider server 1 104 and app 2 is associated with goods/services provider server 2 106. For example, app 1 can communicate user-selected information and/or a user's personal/financial information to goods/services provider server 1, when a user performs an action associated with app 1. The user-selected information can be a user's preference of one or more goods/services provided by the goods/services provider. Similarly, app 2 can communicate with goods/services provider server 2 106. Further, FIG. 1B also shows that validation server 116 can communicate with either or both of the service providers.

The example embodiment shown in FIG. 10 corresponds to a particular context of transportation in which the disclosed embodiments are applicable. Accordingly, the goods/service providers are related to transportation, indicated as transportation server 1 104 and transportation server 2 106. For example, transportation server 1 104 and/or transportation server 2 106 can be in connection with a car rental, a ride share, a bike share, public transport, or the like. In FIG. 10, validation server 116 is shown to be included as part of a bigger and more functional management server 110. Further, FIG. 10 also shows that management server 110 server 116 can communicate with either or both of the transportation servers. For example, management server 110 can communicate payment-related data or transaction-related data with the transportation servers. Wth respect to the embodiment shown in FIG. 10, when a user performs an action on app 1 (step 1 in FIG. 10), app 1 composes a message and generates a key for app 2. For example, in FIG. 10, the action corresponds to a user booking a ride using app 1. This message can contain complex data of (e.g., a JavaScript Object Notation JSON object with fields to identify details of the ride to be booked and the user performing the booking). The message and the key are sent to a server (e.g., management server 110) which authenticates app 1 (step 2) and stores the message usually in an encrypted form (step 3). App 1 composes a deep link to launch app 2 and includes the key as a parameter. The deep link identifies a specific location associated with a specific functionality to be activated within app 2. For example, the deep link includes the key and a URI associated with a specific location with app 2. App 1 then launches app 2 (step 4). After app 2 is launched, app 2 recognizes the request from the context of the deep link and uses the message key to retrieve the original message from the server (step 5). The server authenticates app 2 and validates the key that provides access to the message, decrypting it as necessary (step 6). The message is then delivered to app 2 (step 7).

In some embodiments, one or more functionalities of app 1 and/or app 2 are implemented via software development kits (SDKs). A SDK can be integrated as a part of app 1 and app 2 and can be implemented in many operating systems such as iOS and Android. A SDK leverages application programming interfaces (APIs) to interact/communicate with diverse computing platforms and systems, e.g., owned and operated by different goods/service providers. For example, a first goods/services provider can integrate the SDK offered by a second goods/services provider so as to offer the goods/services provider of the second provider. The SDK can be customized to tailor the placement of buttons and other user-interface elements (in connection with the goods/services offered by the second goods/services provider) in an app provided by the first goods/service provider. Although the discussions herein are based on two apps (app 1 and app 2), it will be understood that embodiments disclosed herein do not limit the number of apps that can communicate with each other. In other words, a user's mobile device can include multiple apps, and more than two apps can communicate with each other for exchanging data. Furthermore, in some embodiments, a portion of the data exchange can be paused to additionally include user-provided data, e.g., in response to certain prompts provided by an app to a user. It will be further understood that although the examples and use-cases discussed in this disclosure focus on transportation as a context, embodiments of the present disclosure have a broader applicability and thus can be applied to various contexts and are not necessarily limited to a transportation context.

FIG. 2 illustrates a flow from the perspective of a first application that intends to initiate communication with a second application, the first application and the second application running on the user's mobile device, according to an embodiment of the present disclosure. The first application corresponds to the calling app and the second application corresponds to the called app. At step 202, the first app receives a user request for goods/services associated with the second app. For example, the user request can be in connection with a car rental, a ride share, a bike share, public transport, or the like. Such a request can be for the whole or a portion of a trip for the user, from a starting location to an ending location. At step 204, the first app generates a key using a cryptographic protocol, e.g., using the SHA 1 algorithm. At step 206, app 1 creates a secure channel for communications with a management server, e.g., using HTTPS protocol. At step 208, app 1 sends a message associated with the user's request and the key to the management server over the secure channel. At step 210, app 1 creates a deep link with a second app (app 2) running on the user's mobile device. Typically, the deep link is with respect to a specific location within the second app and thus includes a URI identifying the specific location. The deep link established between app 1 and app 2 also includes the key. App 1 launches (at step 212) app 2. In some embodiments, the key is automatically disposed by app 1 after app 2 is launched.

FIG. 3 illustrates a flow from the perspective of a second application (app 2) that receives communication from a first application (app 1), the first application and the second application running on the user's mobile device, according to an embodiment of the present disclosure. The first application corresponds to the calling app and the second application corresponds to the called app. At step 302, the second application receives a request to establish a deep link with app 1. The request includes a key transmitted by app 1. At step 306, app 2 creates a secure channel for communications with a management server, e.g., using HTTPS protocol. At step 308, app 2 sends the key to the management server over the secure channel. At step 310, app 2 receives a message from the management server. In some embodiments, app 2 communicates (option step 312) with one or more goods/services provider servers based on the whole or a portion of the message. For example, the goods/services provider can be a transportation provider in the context of transportation. In such a scenario, a user can be on a trip from a starting location to an ending location. A portion of the trip can involve public transportation and another portion can involve ridesharing. Thus, app 1 can be associated with a public transportation provider and app 2 can be associated with a ridesharing provider. In some embodiments, app 1 can be an application that offers multi-modal transportation options and app 1 communicates with multiple transportation apps (such as app 2, app 3, app 4, etc.) provided by transportation providers or hotel/lodging providers. The message from app 1 can be related to a user's request for a rideshare involving a portion of the user's trip. The message, for example, can include the user's current location (e.g., in the form of a latitude/longitude pair), a user's credentials such as name and financial information, a starting location and an ending location of the user's trip. Depending on the specific transportation option, various other information can be included in the message. For example, for a rideshare option, the other information can identify a type of vehicle the user prefers, whether or not the user intends to ride with other passengers, a number of seats that the user wants to reserve, a time of day when the user wants to reserve the rideshare vehicle etc.

FIG. 4 illustrates a flow from the perspective of a management server that facilitates secure communications between mobile apps, according to an embodiment of the present disclosure. The first application corresponds to the calling app (e.g., the first app or app 1) and the second application (e.g., the second app or app 2) corresponds to the called app. At step 402, the management server receives a request for establishing a secure channel with app 1. At step 404, the management server receives a message and a key over the secure channel from the first application. In some embodiments, the management server encrypts (at step 410) the message prior to storing (at step 412) the message using a cryptographic protocol (e.g., SHA 1). The encryption process, in some embodiments, uses a different cryptographic key than the key generated by app 1. At step 414, the management server determines whether or not a lifespan of the message has expired. If the management server determines that the lifespan of the message has expired, the management server disposes (at step 426) the message. However, if the management server determines that the lifespan of the message has not expired, the management server waits for a request to retrieve the message. At step 416, the management server receives a request for establishing a secure channel with app 2. The management server receives a key at step 418 from app 2. At step 420, the management server determines whether or not the key is valid by comparing the key received from app 2 with the key received from app 1. This step is for authenticating the identity of app 2. If the management server determines (at step 422) that the key is not valid (e.g., the comparison of the keys results in a mismatch), then the management server sends a notification to app 2 indicating that authentication was unsuccessful. If, however, the management server determines (at step 424) that the key is valid (e.g., the comparison of the keys results in a match), then the management server sends the message to app 2. In some optional embodiments, the management server communicates with the goods/services provider server (e.g., transportation server) associated with the second app for exchanging billing information, product/services information, conforming that the user ordered the goods/services, details of the goods/services ordered by the user, analytics, and other such information. Information pertaining to this communication can be saved in a database coupled to the management server. In some embodiments, the first application and second application use a communication protocol to communicate messages to each other, without the first message following the communication protocol. Further, in some embodiments, the communication protocol establishes a maximum size limit for messages communicable between the first application and second application, but the size of the message (communicated by the first application to the second application indirectly via a remote server) is larger than a maximum size limit permitted by the communication protocol.

FIG. 5 illustrates example components involved in secure communications between two apps. For example, FIG. 5 illustrates a message, a key, and a deep link. The deep link is an example of the information provided by an app 1 to an app 2. The message indicates a request to rent a bike from a location identified with a latitude of 30.3677 degrees and a longitude of −97.7412 degrees. Further, the key (e.g., generated by app 1) is identified as 7200062e9700146715761375100001. The deep link established between app 1 and app 2 is identified as app2://ridetap/7200062e9700146715761375100001. In this example, the URI corresponds to app2://ridetap and the specific location within app 2 is identified with the address (or, identifier) 7200062e9700146715761375100001. Portion 502 of the key corresponds to a medium access control (MAC) ID of a user's mobile device, portion 504 corresponds to a timestamp of generation of the message by the first application, and portion 506 corresponds to a counter.

Figure 6:
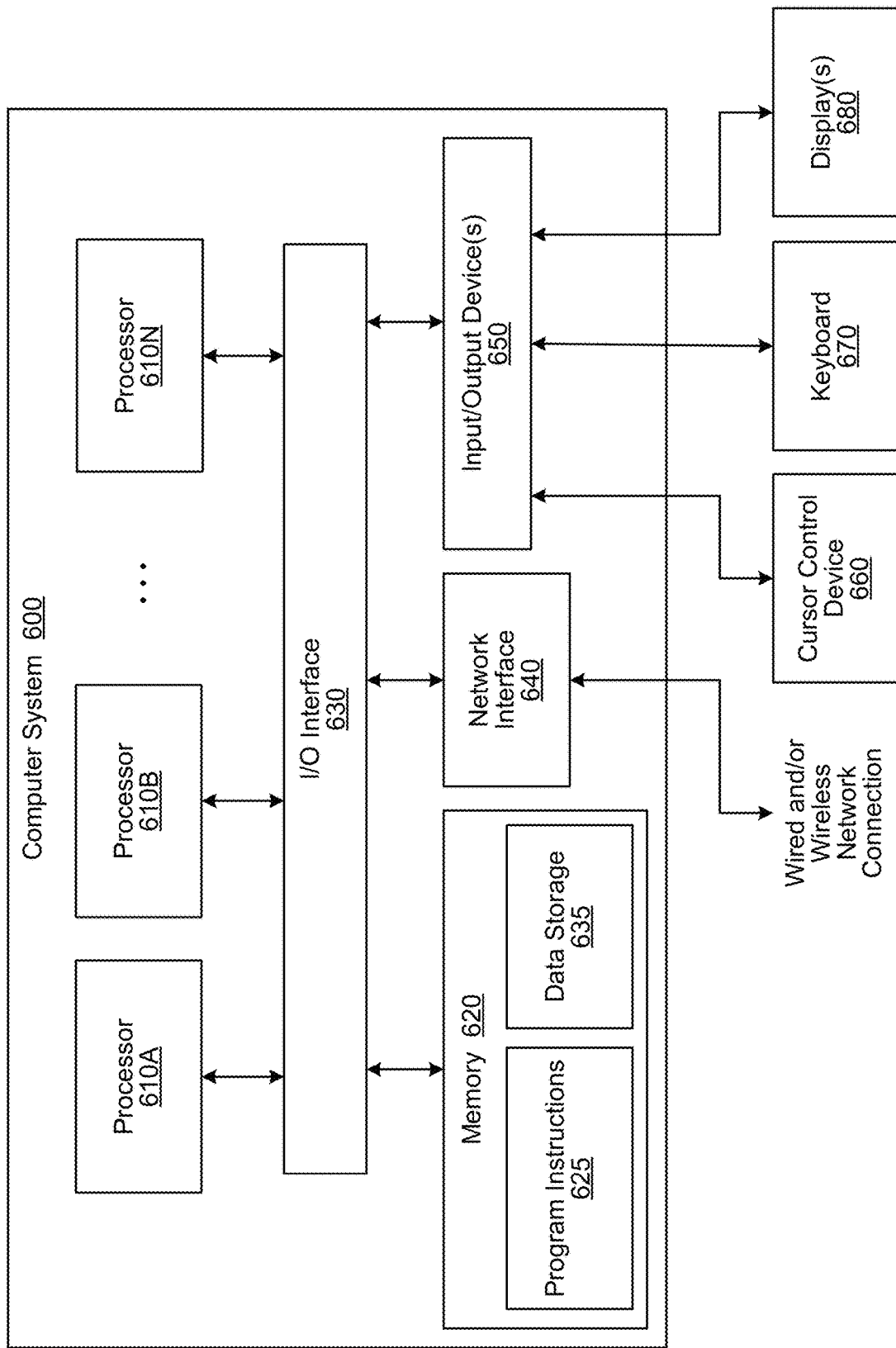
FIG. 6 illustrates the components of a computer system implementing the secure app-to-app IPC system according to various embodiments.

FIG. 6 illustrates the components of a computer system implementing the secure app-to-app IPC system according to various embodiments. The validation server or the management server illustrated in FIGS. 1A, 1B, and 10 may be implemented or executed, at least in part, by one or more computer systems. In various embodiments, computer system 600 may be a server, a workstation, a desktop computer, a laptop, a microcontroller, a system on a chip or the like. In some embodiments, system 600 may be used to implement the validation server and the management server functionalities of FIGS. 1A, 1B, and 10. As illustrated, computer system 600 includes one or more processor(s) 610A-N coupled to a system memory 620 via an input/output (I/O) interface 630. Computer system 600 further includes a network interface 640 coupled to I/O interface 630, and one or more input/output devices 650, such as cursor control devices 660, keyboard 670, and display(s) 680.

In various embodiments, computer system 600 may be a single-processor system including one processor 610A, or a multi-processor system including two or more processors 610A-N (e.g., two, four, eight, or another suitable number). Processor(s) 610A-N may include any processor capable of executing program instructions. For example, in various embodiments, processor(s) 610A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 610A-N may commonly, but not necessarily, implement the same ISA.

Figure 1C:
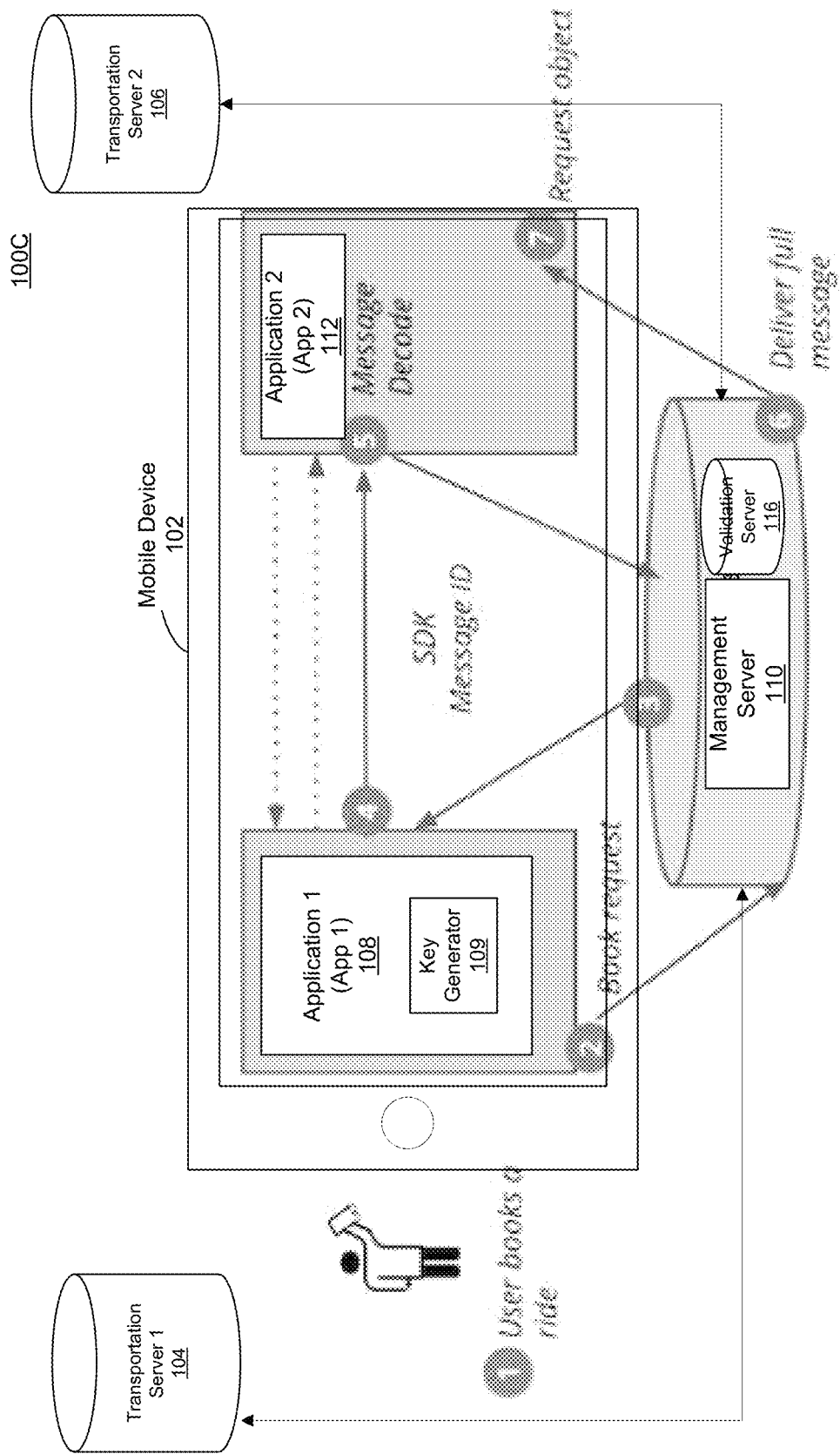

System memory 620 may be configured to store program instructions (e.g., the real-time communications controller functions) and/or data accessible by processor(s) 610A-N. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in connection with FIG. 1, may be stored within system memory 620 as program instructions 625 and data storage 635, respectively. Additionally or alternatively, the real-time communications controller functions may be a software program that is stored within system memory 620 and is executable by processor(s) 610A-N. In other embodiments, program instructions and/or data may be received, sent or stored upon different types of computer-accessible media or on similar media separate from system memory 620 or computer system 600. Generally speaking, a computer-accessible medium may include any tangible or non-transitory storage media or memory media such as electronic, magnetic, or optical media—e.g., disk or CD/DVD-ROM coupled to computer system 600 via I/O interface 630. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 630 may be configured to coordinate I/O traffic between processor(s) 610A-N, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor(s) 610A-N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor(s) 610A-N.

Network interface 640 may be configured to allow data to be exchanged between computer system 600 and other devices attached to a network, such as an embedded real-time client and one or more mobile devices. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 650 may, in some embodiments, include one or more display terminals, keyboards, keypads, touchpads, scanning devices, RFID readers, NFC readers, voice or optical recognition devices, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, configured to implement certain embodiments described herein, and data storage 635, comprising various data may be accessible by program instructions 625. In an embodiment, program instructions 625 may include software elements of embodiments illustrated in the above FIGs. For example, program instructions 625 may be implemented in various embodiments using any desired programming language, scripting language, or combination of programming languages and/or scripting languages (e.g., C, C++, C#, Java™, JavaScript™, Perl, etc.). Data storage 635 may include data that may be used in these embodiments (e.g., recorded communications, profiles for different modes of operations, etc.). In other embodiments, other or different software elements and data may be included.

The foregoing invention(s) have been described in accordance with the relevant legal standards, thus the description is illustrative rather than limiting in nature. Variations and modifications to the disclosed embodiments may become apparent to a person of ordinary skill in the art in light of this disclosure, and fall within the scope of the invention(s).

We claim:

1. A system for facilitating communications between applications executing on a mobile device by a server, comprising:
a mobile device configured to execute a first application and a second application, wherein:
the first application is configured to:
generate a key for transmission to the second application,
send a request to establish a link to the second application via a communications channel within the mobile device, the request including the generated key, and
transmit a message destined for the second application and the key to a server, the server being external to the mobile device;
the second application is configured to:
receive a request to establish a link with the first application, the request including the key generated by the first application,
in response to receiving the request to establish a link, transmit, to the server, a message request including the key over a secure communication channel, and
receive, from the server, a message originating from the first application; and
the server is in communication with the first application and the second application and implemented on a computer system distinct from the mobile device, wherein the server is configured to:
receive the message and the key from the first application,
receive the message request from the second application, the message request including the key, and
upon validating the keys received from the first and second applications, transmit the message to the second application, and
wherein the first application and the second application are included in a plurality of transportation-related applications, and wherein each application in the plurality of transportation-related applications provides different options for transportation to the user.

2. The system of claim 1, wherein the server is further configured to:
authenticate the first application as being authorized to transmit action requests to the second application.

3. The system of claim 1, wherein the server is further configured to:
authenticate the second application as being authorized to receive action requests from the first application.

4. The system of claim 1, wherein the server is further configured to:
encrypt the message;
store the encrypted message using the key; and
upon receiving the message request from the second application, locate the message using the key and decrypting the message.

5. The system of claim 1, wherein the first application and second application use a communication protocol to communicate messages to each other, without the first message following the communication protocol.

6. The system of claim 5, wherein the communication protocol establishes a maximum size limit for messages communicable between the first application and second application, and wherein the size of the message is larger than a maximum size limit permitted by the communication protocol.

7. The system of claim 1, wherein the first application is a coordinating application for providing multi-modal transportation options and each of the other applications in the plurality of transportation-related applications provides different options for transportation to the user.

8. The system of claim 1, wherein the key is communicated from the first application to the second application as a deep link parameter.

9. The system of claim 1, wherein the message specifies an action to be taken by the second application.

10. The system of claim 9, wherein the action is the booking of a transportation option associated with one or more transportation providers, wherein the transportation option is based at least in part on a current location of the mobile device of the user.

11. The system of claim 1, wherein the message is encrypted, and the server is further configured to decrypt the message upon receiving the message request from the second application.

12. The system of claim 1, wherein the key includes a unique device identifier corresponding to the mobile device of the user, a timestamp, and a counter.

13. The system of claim 1, wherein the second application is further configured to exchange information related to the message with a goods/services provider associated with the second application, based at least on details included in a portion of the message.

14. A method for facilitating communications between applications executing on a mobile device by a server, comprising:
- in a first application executing on a mobile device:
  - generating a key for transmission to a second application executing on the mobile device,
  - sending a request to establish a link to the second application via a communications channel within the mobile device, the request including the generated key, and
  - transmitting a message destined for the second application and the key to a server, the server being external to the mobile device;
- in the second application executing on the mobile device:
  - receiving a request to establish a link with the first application, the request including the key generated by the first application,
  - in response to receiving the request to establish a link, transmitting, to the server, a message request including the key over a secure communication channel, and
  - receiving, from the server, a message originating from the first application;
- wherein the server is in communication with the first application and the second application and implemented on a computer system distinct from the mobile device, and wherein the server is configured to:
  - receive the message and the key from the first application,
  - receive the message request from the second application, the message request including the key, and
  - upon validating the keys received from the first and second applications, transmit the message to the second application, and
- wherein the first application and the second application are included in a plurality of transportation-related applications, and wherein each application in the plurality of transportation-related applications provides different options for transportation to the user.

15. The method of claim 14, wherein the first application is a coordinating application for providing multi-modal transportation options and each of the other applications in the plurality of transportation-related applications provides different options for transportation to the user.

16. The method of claim 14, wherein the key is communicated from the first application to the second application as a deep link parameter.

17. The method of claim 14, wherein the message specifies an action to be taken by the second application.

18. The method of claim 14, wherein the action is the booking of a transportation option associated with one or more transportation providers, wherein the transportation option is based at least in part on a current location of the mobile device of the user.

* * * * *